May 15, 1962 E. K. WAGNER 3,034,715
ELECTRICAL MEASURING APPARATUS
Filed Dec. 10, 1956 5 Sheets-Sheet 1

INVENTOR
Elmer K. Wagner
by Carlson, Pitzner, Hubbard & Wolfe
ATTORNEYS

May 15, 1962
E. K. WAGNER
3,034,715
ELECTRICAL MEASURING APPARATUS
Filed Dec. 10, 1956
5 Sheets-Sheet 2
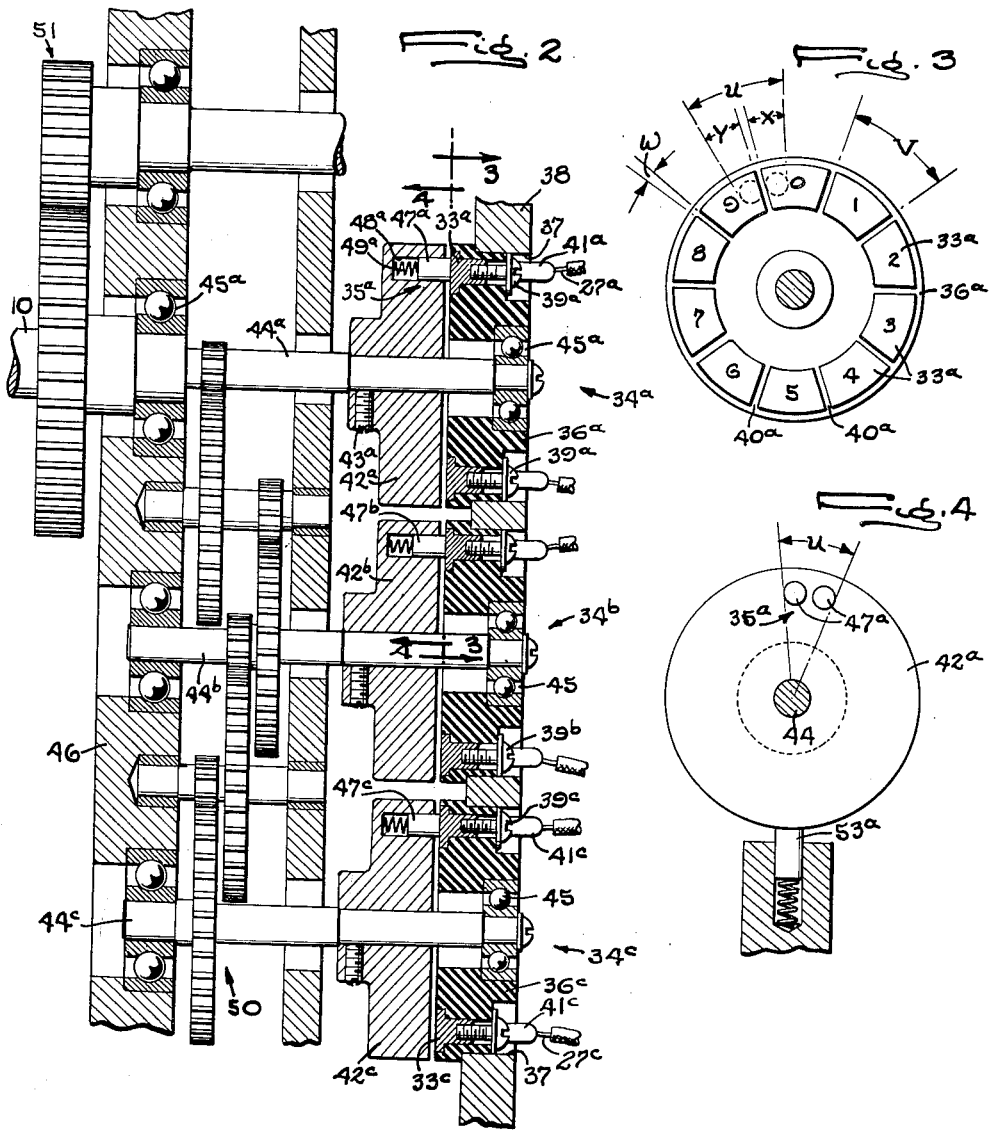
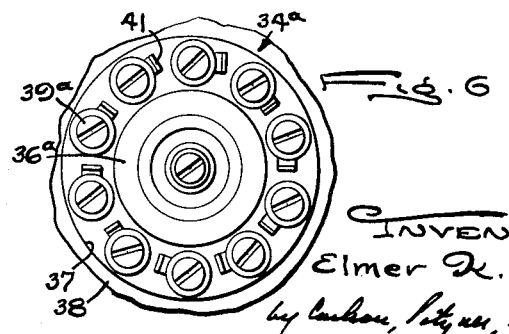
INVENTOR
Elmer K. Wagner
by Jackson, Fitzner, Hubbard v Wolfe
ATTORNEY.

May 15, 1962   E. K. WAGNER   3,034,715
ELECTRICAL MEASURING APPARATUS
Filed Dec. 10, 1956   5 Sheets-Sheet 3
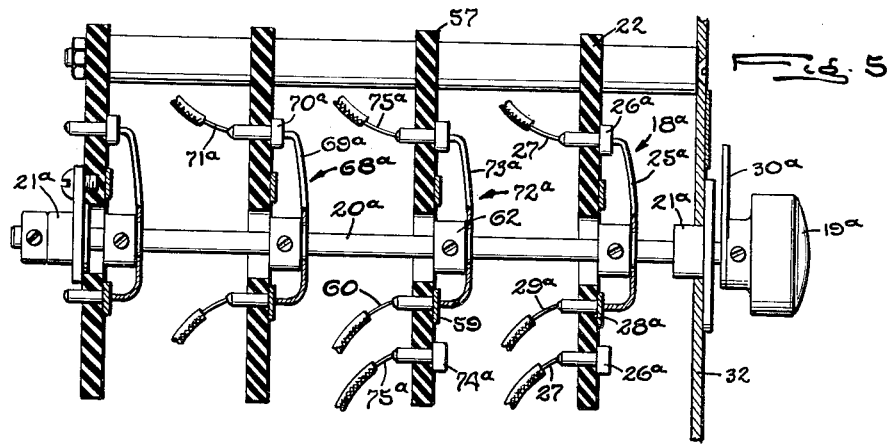
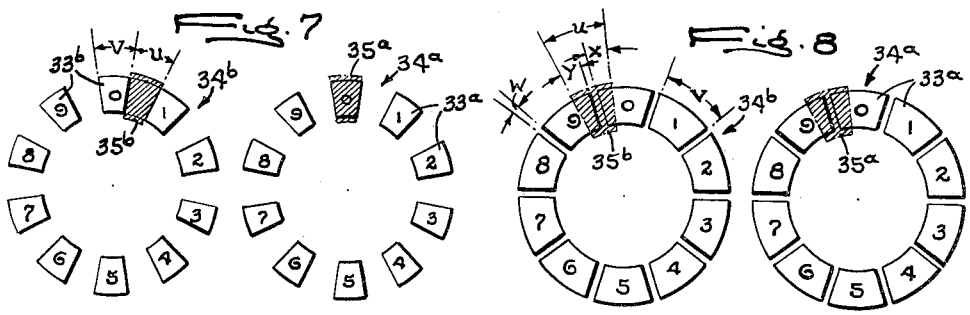
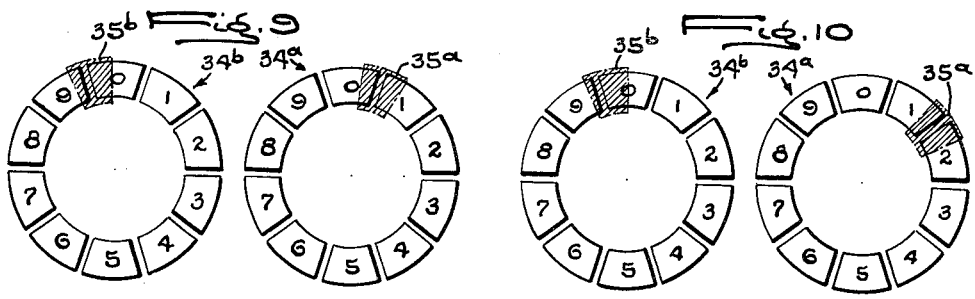
INVENTOR
Elmer K. Wagner
by Carlsen, Pitzner, Hubbard & Wolfe
ATTORNEYS

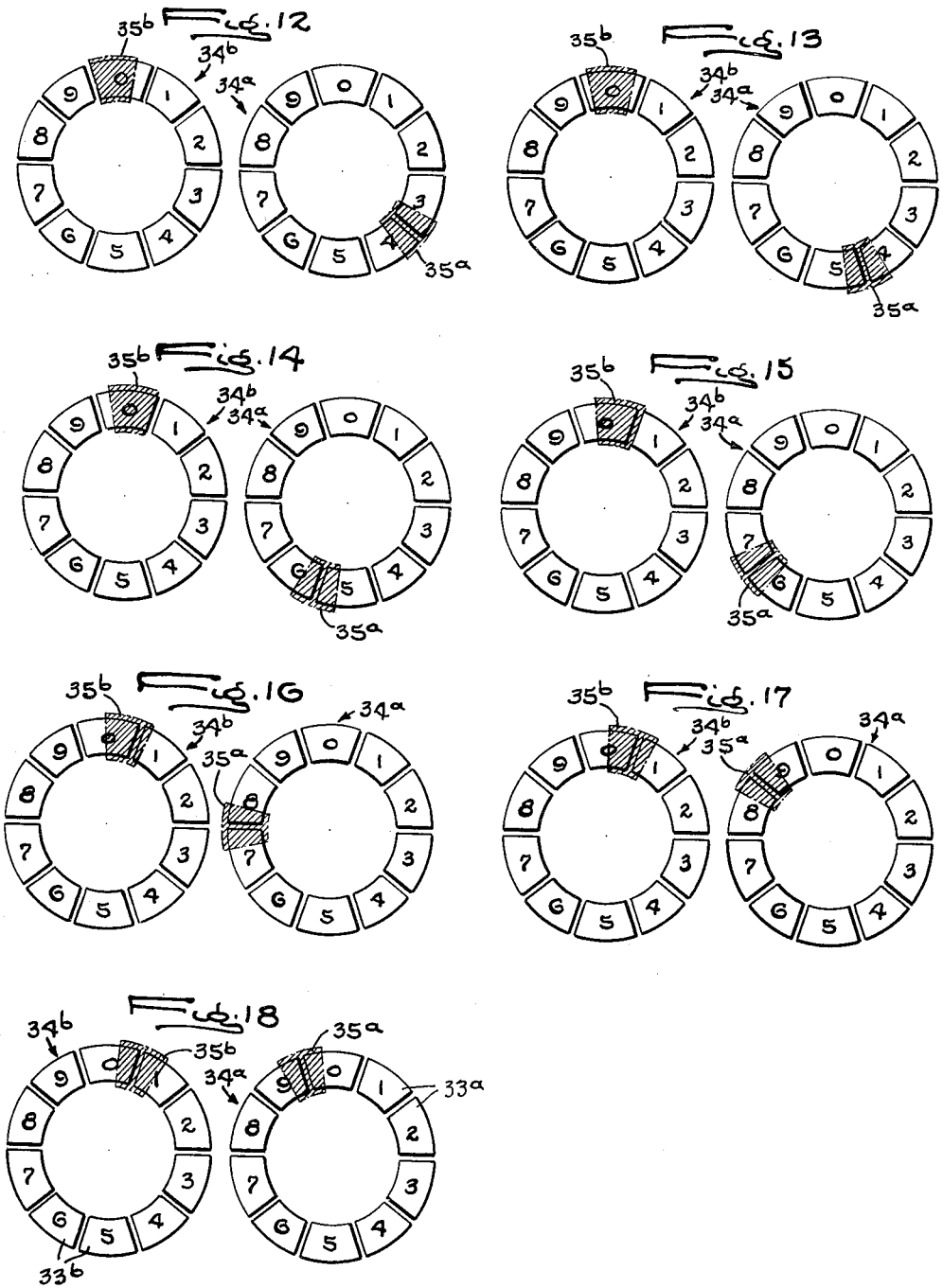

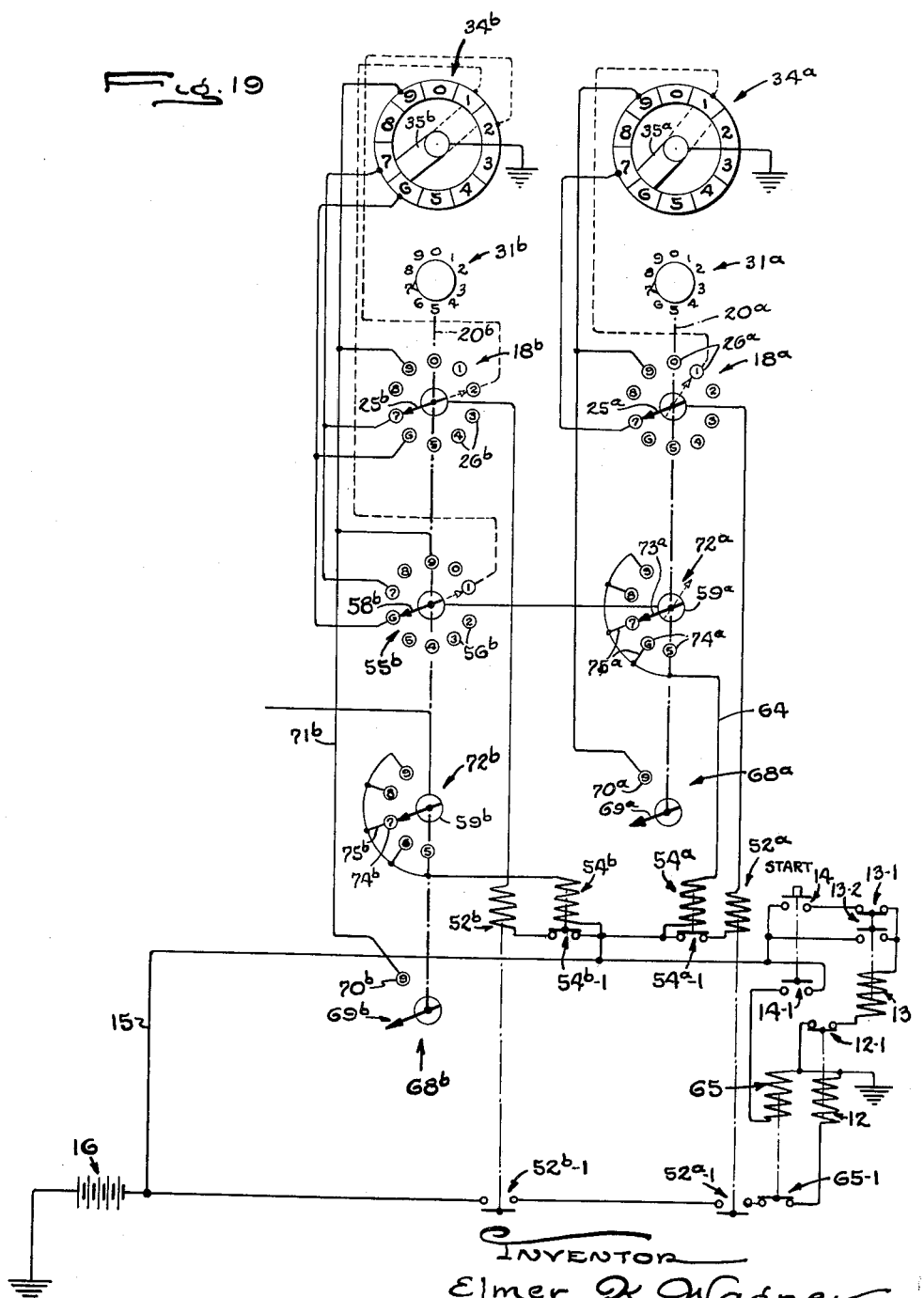

United States Patent Office 3,034,715
Patented May 15, 1962

3,034,715
ELECTRICAL MEASURING APPARATUS
Elmer K. Wagner, Rockford, Ill., assignor to The Ingersoll Milling Machine Company, Rockford, Ill., a corporation of Illinois
Filed Dec. 10, 1956, Ser. No. 627,301
21 Claims. (Cl. 235—132)

This invention relates to mechanism for measuring the angular movement of a rotary part and giving an electrical signal which may be utilized, for example, to stop the part when an accumulated total of its revolutions reaches a desired number comprising one or more digits.

More particularly, the invention relates to measuring mechanism in which the desired number is preselected on a plurality of individually adjustable multiple switches each corresponding to one digit of the number in accordance with the decimal system of numbering. Associated with each switch is a commutator having a succession of segments corresponding to the different numbers of the digit and engaged successively by a brush during the angular movement being measured. Through electrical connections between the switches and the respective commutator segments, the electrical control signal is given in response to simultaneous engagement of the different brushes with the corresponding segments selected on the switches.

The general object of the invention is to provide a novel system of the above character which, compared to similar prior systems, may be operated at higher speeds, is of simpler and less expensive construction and is more dependable in its operation.

Another object is to simplify the construction and insure the reliability of the improved measuring system by forming each commutator with only one brush and ten segments which may be manufactured easily without precision in the size of the segments and the brush or in the spacing of the segments.

A further object is to avoid such precision in the manufacture of each commutator by making the brush and the segments thereof wide enough that the brush overlaps adjacent segments as it moves from one to the next.

Still another object is to provide novel control circuits which permit each commutator brush to overlap adjacent segments while insuring a correct electrical response only to the selected number.

A more detailed object is to provide novel lockout circuits which compensate for premature contact of the leading edge portions of the commutator brushes with selected segments and thereby avoid erroneous response to numbers preceding the selected number.

A further detailed object is to provide novel disabling circuits which compensate for overlap of the trailing edge portion of each brush with an associated segment in the zero or starting position of the brush and thereby avoid premature response to certain numbers selectable on the switches.

The invention also resides in the novel construction of the brushes to insure good contact with adjacent segments in passing from one segment to the next in spite of variations in the heights of the contact faces of the segments.

Other objects and advantages of the invention will become apparent from the following detailed description taken in connection with the accompanying drawings, in which FIGURE 1 is a schematic view and wiring diagram of a measuring system embodying the novel features of the present invention.

FIG. 2 is a fragmentary sectional view showing the commutators and their connection with a shaft whose rotation is to be measured.

FIGS. 3 and 3 are sectional views taken along the lines 3—3 and 4—4 respectively of FIG. 2.

FIG. 5 is a fragmentary sectional view of a bank of multiple switches associated with one of the commutators.

FIG. 6 is a fragmentary rear elevational view of one commutator.

FIG. 7 is a schematic view of a modified commutator construction.

FIGS. 8 through 18 are schematic views of the commutators with their brushes in different positions.

FIG. 19 is a schematic view and wiring diagram of two of the commutators with their brushes in different positions than shown in FIG. 1.

Figure 1:
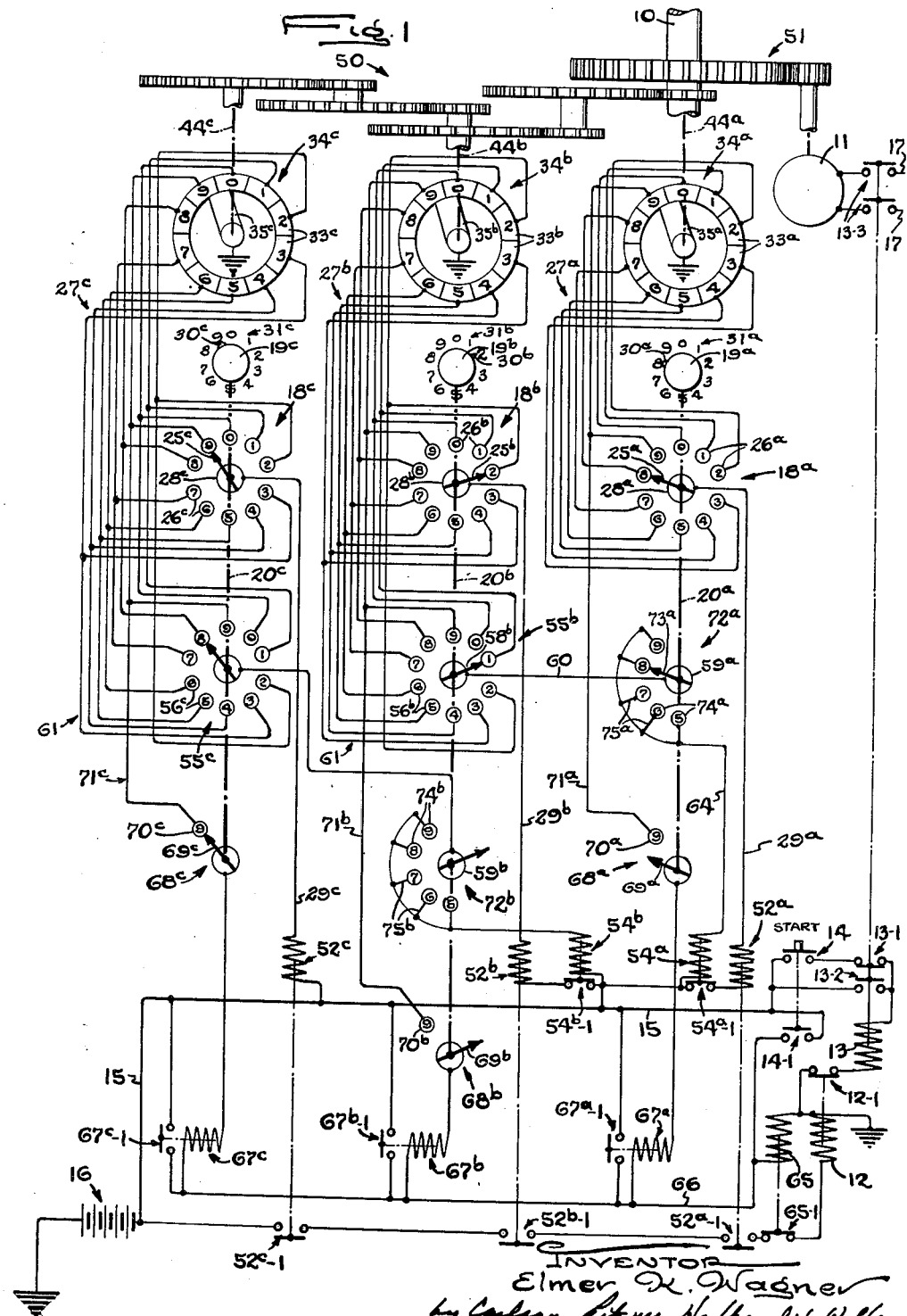

The invention is shown in the drawings for purposes of illustration embodied in mechanism for measuring the rotation of a shaft 10 driven by a power actuator such as a motor 11 and giving a signal when an accumulated total of the shaft revolutions reaches a preselected number comprising one or more digits. In this instance, the signal is energization of a relay 12 which operates when energized to interrupt a circuit to a motor relay 13 and thereby stop the motor and the shaft. The movements of the shaft thus measured may be utilized in various ways. For example, a machine part (not shown) connected to the shaft may be shifted to a desired position corresponding to the number of revolutions chosen.

The motor 11 is started by manual closure of a normally open switch 14. This completes an energizing circuit for the motor relay 13 extending from ground through normally closed contacts 12–1 of the signal relay 12, the coil and normally closed contacts 13–1 of the motor relay, a conductor 15, and a battery 16 back to ground. To maintain this circuit closed after the start switch is released and opens, normally open contacts 13–2 of the motor relay are connected in a shunt around its normally closed contacts 13–1 and the start switch, the contacts 13–2 closing before the contacts 13–1 open upon energization of the relay. Such energization also results in closure of other normally open contacts 13–3 which complete a motor energizing circuit through suitable supply lines 17. With this arrangement, the motor is energized and deenergized respectively during energization and deenergization of the motor relay. The latter is always deenergized during energization of the signal relay but may be energized when the signal relay is deenergized.

Selection of a desired number of revolutions of the shaft 10 is made manually at a control station by turning a plurality of knobs 19ᵃ, 19ᵇ and 19ᶜ and thereby adjusting associated selector switches 18ᵃ, 18ᵇ and 18ᶜ. Each switch corresponds to a different digit of the desired number and provides a decade of individually selectable integers from 0 to 9. The first or units switch 18ᵃ shown the farthest to the right in FIG. 1 corresponds to the lowest order or units digit. The second or tens switch 18ᵇ then corresponds to the next order or tens digit and so on for as many switches as are used. Herein, there are three switches. Thus, if the unit being used is onetenth of a revolution of the shaft 10 as in this instance and it is desired to rotate the shaft through 76.2 revolutions for example, the respective integers selected on the different switches would be "2" on the units switch, "6" on the tens switch and "7" on the hundreds switch.

The selector switches 18ᵃ, 18ᵇ and 18ᶜ in this instance are of the same construction, their corresponding parts bearing the same reference numbers but different suffix letters a, b and c. The units switch 18ᵃ, for example, (see FIGS. 1 and 5), includes a shaft 20ᵃ supporting the knob 19$^a$ journaled in spaced bearings 21$^a$. Angularly spaced around the shaft and secured to an insulating plate 22 are ten contacts 26$^a$ corresponding to the ten consecutive integers from 0 to 9 which may be selected for the units digit. During turning of the shaft by the knob, the contacts are engaged individually and in succession by one end of a wiper 25$^a$ in the form of a spring arm rigid with but insulated from the shaft. The other end of the wiper arm rides on a conductor ring 28$^a$ secured to one side of the plate and connected to a conductor 29$^a$. To indicate which of the contacts is engaged by the wiper, a pointer 30$^a$ projects from the knob for movement therewith to a position opposite a corresponding number 31$^a$ (FIG. 1) marked on a panel 32 rigid with the plate. Herein, such numbers increase from 0 to 9 during movement of the pointer in a clockwise direction as viewed in FIG. 1.

Cooperaing with the respective selector switches 18$^a$, 18$^b$ and 18$^c$ to obtain response to the numbers selected thereon are a corresponding number of commutators 34$^a$, 34$^b$ and 34$^c$. Herein, the commutators are of the same construction with corresponding parts bearing the same but suffixed reference numbers. The units commutator 34$^a$ (FIGS. 1 to 4 and 6) comprises ten segments 33$^a$ of conductive material circumferentially spaced in an annular series and engaged successively by a brush 35$^a$ which revolves relative to the segments as an incident to rotation of the output shaft 10. In this instance, the segments 33$^a$ are embedded in an annular block 36$^a$ of insulating material which is secured stationarily in an aperture 37 in a mounting plate 38. Each segment presents a flat axially facing contact face disposed flush with one side of the block and separated from adjacent faces by narrow strips 40$^a$ of the block (FIG. 3). The circumferential width of each face may be expressed in degrees of brush movement and is indicated at $v$ in FIG. 3. Conducting screws 39$^a$ threaded into the segments 33$^a$ clamp the same against the block and carry connectors 41$^a$ which are welded to conductors 27$^a$ to connect the segments individually to the corresponding units switch contacts 26$^a$.

The units commutator brush 35$^a$ (FIGS. 2 and 4) is mounted on a disk 42$^a$ of conducting material coaxial with and axially spaced from the series of units segments 33$^a$. A hub on the disk is adjustably secured as by a screw 43$^a$ to a shaft 44$^a$. The latter is journaled in spaced bearings 45$^a$ supported by the corresponding insulating block 36$^a$ and by a second mounting plate 46 fixed relative to and paralleling the other plate 38.

As will be described later, the units brush 35$^a$ overlaps adjacent segments 33$^a$ in moving from one segment to the next during rotation of the output shaft 10. To insure good electrical contact of the brush with both segments while avoiding precision in the construction and mounting of the segments, the brush comprises two circumferentially spaced elements 47$^a$ (FIGS. 2 and 4) which are yieldably urged individually into contact with the segments. Thus, if the contact faces of adjacent segments do not lie flush with each other in the same plane, or if the insulating strip 40 separating adjacent segments projects beyond either face, either of the brush elements may shift relative to the supporting disk 42$^a$ and the other element to accommodate such variations in the axial positions of the strips and the faces of the segments.

In the present instance, the individual brush elements 47$^a$ are inserts of suitable conducting material such as carbon slidable in circumferentially spaced recesses 48$^a$ in the supporting disk 42$^a$. Springs 49$^a$ acting between the elements and the bottoms of the recesses urge the elements individually toward and into engagement with the opposing faces of the units segments. The circumferential spacing of the brush elements from each other (FIG. 4) is slightly greater than the circumferential width $w$ of the insulating strips 40 between adjacent segments so that, in the zero position in which the brush overlaps adjacent segments equal amounts (FIG. 3), the brush elements are in full engagement with the respective segments.

During rotation of the units brush 35$^a$, first the leading element 47$^a$ in the direction of rotation of the brush and then the trailing element move from one units segment 33$^a$ to the next. As each element slides across the contact face of each segment, a circuit is established from the supporting disk 42$^a$ to the engaged segment through the engaging brush element. The effective width of the brush during its contact with each segment may be expressed in degrees along the arc of movement of the elements about the axis of the shaft. Herein, where there are two circumferentially spaced elements, the brush width is equal to the circumferential spacing of the leading edge of the leading element and the trailing edge of the trailing element along such arc as indicated at $u$ in FIGS. 3 and 4.

When the units brush 35$^a$ moves onto the units segment 33$^a$ which is connected to the contact 26$^a$ engaged by the wiper 25$^a$ of the units switch 18$^a$, the brush is connected to the wiper through the segment, the conductor 27$^a$ and the contact. To stop the shaft 10 when the accumulated total of its revolutions reaches the number determined by the settings of all three wipers 25$^a$, 25$^b$ and 25$^c$, the simultaneous completion of the circuits through these wipers and the three brushes is utilized to deenergize the motor. While this may be effected in various ways, it is preferred to utilize separate relays 52$^a$, 52$^b$ and 52$^c$ (FIG. 1) for the respective commutators and to energize the signal relay 12 in response to energization of all three relays at the same time. With this arrangement, the circuit through each brush and the associated relay is simplified by connecting the brush directly to ground thereby avoiding the necessity of an insulated slip ring.

In the present instance, the units brush 35$^a$ is grounded through a movable contact element 53$^a$ (FIG. 4) spring urged against the periphery of the supporting disk 42$^a$. The coil of the units relay 52$^a$ is connected in series with the conductor 29$^a$ between the wiper 25$^a$ and the battery conductor 15. Thus the circuit for the coil is completed through the battery when the units brush engages the segment 33$^a$ selected on the units switch 18$^a$. The tens and hundreds relays 52$^b$ and 52$^c$ are connected similarly to their associated wipers 25$^b$ and 25$^c$. To energize the signal relay 12 for stopping the output shaft 10 in response to simultaneous energization of all three commutator relays, normally open contacts 52$^a$–1, 52$^b$–1 and 52$^c$–1 are connected in series with the coil of the signal relay and the battery 16 (FIG. 1).

In the counting of the revolutions of the output shaft 10, each of the commutator brushes 35$^a$, 35$^b$ and 35$^c$ moves angularly with its shaft ten times as far as the brush corresponding to the next higher digit of the desired number. In other words, movement of the hundreds brush 35$^c$ through one revolution is accompanied by movement of the tens brush 35$^b$ through ten revolutions and of the units brush 35$^a$ through one hundred revolutions. Such proportional movement of the brushes during rotation of the output shaft is effected in this instance by coupling the hundreds shaft 44$^c$ to the tens shaft 44$^b$ and the latter to the units shaft 44$^a$ through suitable reduction gears 50 (FIG. 2). The units shaft 44$^a$ is an extension of the output shaft so as to rotate at the same rate as the latter and is connected to the motor through reduction gears 51. Referring to FIGS. 1, 3 and 7 to 19, the direction of rotation of the brushes during energization of the motor is clockwise.

The hundreds commutator 34$^c$ and the parts including the selector switch 18$^c$ and the relay 52$^c$ associated therewith are related to the tens commutator 34$^b$ and its parts in the same way that the latter are related to the units commutator 34$^a$ and its parts. In view of this, the following discussion will be simplified by first assuming that only the units and tens commutators and their parts are present. Under this condition as shown in FIG. 18, the circuit through the signal relay 12 is completed for stopping the motor 10 during simultaneous engagement of just the units and tens brushes 35ª and 35ᵇ with their segments 33ª and 33ᵇ which have been selected by the wipers 25ª and 25ᵇ.

To insure that the signal relay circuit will be completed in response to every number from 01 to 99 which may be selected on the multiple switches 18ª and 18ᵇ, the tens brush 35ᵇ should move into contact with every one of the tens segments 33ᵇ while the units brush 35ª is wiping across its "0" segment 33ª. Also, the tens brush should remain in continuous contact with each tens segment while the units brush progresses from the "0" segment through substantially a full revolution and again is contacting the "0" segment. Since the tens brush is geared to the units brush to move through one-tenth of a revolution during every revolution of the units brush, the desired continuous contact of the tens brush with each tens segment would be obtained if two conditions were satisfied. The first is that the leading edge of the tens brush just moves onto the next segment as the units brush moves across its number "0" segment as shown in FIG. 7. The second condition is that the sum of the circumferential width $u$ of the brush and the width $v$ of the segment as shown in this figure be equal to just slightly less than 36 degrees, that is, one-tenth of a revolution of the tens brush. Under these conditions, the tens brush then would contact only one segment at a time and would move into contact with each tens segment just after the units brush has completed the number of revolutions corresponding to that tens segment.

The above conditions can be met by precision in the construction and mounting of the segments and the brushes and in the connection between the brushes. In order to avoid such precision and still make high speed operation possible, it is desirable to make the tens brush and each tens segment wide enough that the sum of their widths $u$ and $v$ is greater than 36 degrees as shown in FIG. 3. With this construction, the brush contacts or overlaps adjacent segments as it moves from one to the next. The amount the brush moves while thus contacting two segments may be referred to as degrees of overlap and is equal to the amount by which the sum of the brush and segment widths exceeds 36 degrees. It is also desirable that this overlap be divided so that one edge portion of the brush, herein the leading edge portion, contacts the "0" tens segment and the other edge portion contacts the "9" segment when the brush is in its zero position as shown in FIGS. 1 and 8. This position corresponds to the zero of the tens digit of the number to be counted.

The amount in degrees along the arc of movement of the tens brush 35ᵇ that the leading edge portion thereof overlaps the "0" tens segment when the brush is in its zero position may be referred to as the leading overlap of the brush and is indicated at $x$ in FIGS. 3 and 8. Similarly, the amount the trailing edge portion overlaps the number "9" segment may be referred to as trailing or lagging overlap indicated at $y$ in FIGS 3 and 8. In this instance, adjacent segments are spaced apart approximately 3.6 degrees as indicated at $w$. The leading overlap $x$ is equal to the lagging overlap $y$ which is approximately 10.8 degrees. This corresponds to the distance through which the tens brush moves while the units brush 35ª is moving through .3 of a revolution, that is, a distance corresponding to three units of the number to be counted. The units commutator 34ª having the same construction as the tens commutator 34ᵇ, the units brush 35ª similarly overlaps the number "9" and "0" units segments in its zero position.

The leading overlap $x$ of the tens brush 35ᵇ gives rise to erroneous stopping of the motor 11 in response to certain numbers selected on the units and tens switches 18ª and 18ᵇ. This will be explained in connection with FIGS. 8 to 18 which show schematically different relative positions of the brushes as they advance clockwise from their zero positions shown in FIG. 8. After the units brush 35ª has advanced .1 of a revolution into overlapping contact with its "0" and "1" segments, the tens brush will have advanced through .01 of a revolution and still is overlapping its "9" and "0" segments shown in FIG. 9. After advance of the units brush through two units or .2 of a revolution, this brush will be overlapping its "1" and "2" segments and the tens brush will still overlap its "9" and "0" segments as shown in FIG. 10.

The tens brush remains in contact with its "9" segment until the units brush has advanced .3 of a revolution and is overlapping its "2" and "3" segments as shown in FIG. 11. Then, the tens brush engages only the "0" segment until the units brush has moved across the "4," "5" and "6" segments as shown in FIGS. 12 to 14 and has completed .7 of a revolution so that it overlaps the "6" and "7" segments as shown in FIG. 15. At the completion of this movement of the units brush, the tens brush will just be contacting its "1" segment. During further advance of the units brush across the "7," "8" and "9" segments and into its zero position, the tens brush will remain in contact with both the "0" and the "1" segments as shown in FIGS. 16 to 18.

If any of the numbers from 01 to 15 is selected on the multiple switches 18ª and 18ᵇ, simultaneous engagement of the brushes 35ª and 35ᵇ with the selected segments 33ª and 33ᵇ will occur only after the units brush 35ª and the output shaft 10 have moved through a distance corresponding to the selected number. Thus, if the number 05, for example, is selected when the brushes are in their zero positions of FIG. 8, the circuit through the tens relay 52ᵇ will be completed through the "0" contact of the tens switch 18ᵇ as soon as the number has been selected. This is because the tens brush already is contacting the selected "0" segment. The circuit through the units relay 52ª, however, remains open after the selection is made and until the units brush has advanced approximately .5 of a revolution and is contacting the selected "5" units segment as shown in FIG. 13. Then both relays are energized to complete the circuit through the signal relay 12 for deenergizing the motor 13 and stopping the output shaft. When this occurs, the units brush will have advanced the desired .5 of a revolution. A similar operation occurs when any of the numbers from 01 to 04 and from 06 to 09 is selected.

With the numbers from 10 to 15, the tens brush 35ᵇ does not move onto the selected "1" segment 33ᵇ until after the units brush 35ª has already passed the units segments 33ª from the "0" segment through the "5" segment in the first revolution of the units brush as shown in FIGS. 9 to 14. Thus, there can be no simultaneous engagement of the tens brush with its "1" segment and of the units brush with any of its "0" to "5" segments in the first revolution of the units brush. The numbers 10 to 15 then, like the numbers 01 to 09, do not give rise to premature stopping of the motor 13. Assuming the number 15 has been selected for example, the tens brush will contact only the "0" tens segment when the "5" units segment is engaged by the units brush during the first revolution of the latter shown in FIGS. 13 and 14. Since the tens brush is not contacting its "1" segment at this time, the tens relay 52ᵇ is deenergized. Therefore, the signal relay circuit is not completed even though the units relay is energized during contact of the units brush with the selected "5" units segment. Simultaneous engagement of the selected segments by the brushes then occurs only after the units brush has advanced through substantially the desired 1.5 revolutions.

Starting with the brushes 35ª and 35ᵇ in their zero positions, the first number giving rise to the problem of premature stopping of the motor 13 in this instance is the number 16. Assuming this number has been selected on the switches 18$^a$ and 18$^b$, the units relay 52$^a$ will be energized during the full period of contact of the units brush with the selected "6" units segment 33$^a$ during the first revolution of the brush as shown in FIGS. 14 and 15. During the final part of this period and as the trailing edge portion of the units brush is moving off of the "6" segment as shown in FIG. 15, the tens brush is moving onto its selected "1" segment for energization of the tens relay 52$^b$. Thus, both relays will be energized and the signal relay 12 will be energized for stopping the motor after the output shaft has advanced only .7 of a revolution rather than the desired 1.6 revolutions.

A similar premature stopping of the output shaft 10 occurs whenever the numbers 17, 18 and 19 are selected. This will be apparent by referring to FIGS. 16, 17 and 18 which show the brushes 35$^a$ and 35$^b$ in simultaneous engagement with the respective pairs of these selected segments 33$^a$ and 33$^b$ during the first revolution of the units brush. Within any of the ranges of ten numbers starting with the number 20, for example, the range from 20 through 29 or that from 30 to 39, the numbers giving rise to the difficulty in premature stopping of the output shaft have the same units digits as those of the range from 10 through 19 giving rise to such difficulty. In this instance then, the output shaft responds prematurely when the selected number is higher than 15 and has a units digit of 6, 7, 8 or 9, these digits corresponding to the units segments engaged by the units brush during premature contact of the tens brush with the selected tens segment.

To avoid the above difficulties of erroneous response to numbers preceding the selected numbers while still permitting overlap of the brushes 35$^a$ and 35$^b$ with adjacent segments, the present invention contemplates disabling the control of the brushes over the motor 11 during the period of premature contact of the tens brush with the selected tens segment and then, after the units brush 35$^a$ has completed the correct number of revolutions corresponding to the selected tens segment, restoring such control to the brushes. This is accomplished by the provision of a novel overriding control means which is responsive to the position of the tens brush and prevents completion of the circuit through the signal relay 12 during the premature contact of the tens brush with the selected segment. This relay then cannot be energized even though both brushes contact their selected segments. As a result, the motor relay 13 remains energized for continued operation of the motor 11 and rotation of the output shaft 10.

Response by the overriding control means to the position of the tens brush 35$^b$ is effected through a multiple lockout switch 55$^b$ (FIG. 1) which cooperates with the tens commutator segments 33$^b$ to establish an auxiliary control circuit after the tens brush contacts the selected tens segment but before the units brush 35$^a$ has completed the corresponding number of revolutions. Upon completion of the auxiliary circuit, the circuit through the signal relay 12 is rendered insensitive to the positions of the brushes. This is accomplished by interrupting the circuit through the units relay 52$^a$ and the units brush. The units relay then cannot pull in to complete the circuit for the signal relay and the latter remains deenergized to permit continued operation of the motor.

To establish the auxiliary circuit during premature contact of the tens brush 35$^b$ with the tens segment 33$^b$ selected on the tens selector switch 18$^b$, the multiple lockout switch 55$^b$ is utilized to extend the auxiliary circuit through the tens segment next preceding the selected segment. The auxiliary circuit then is completed when the tens brush engages such preceding segment. As discussed above in connection with FIGS. 15 to 18 where the "1" segment may be considered the selected one and the "0" segment then is the preceding one, the tens brush contacts the preceding segment during the same time that it prematurely contacts the selected segment. Therefore, completion of the auxiliary circuit and the accompanying interruption of the circuit through the units relay 52$^a$ during the period of contact of the tens brush with the preceding segment also will result in the desired interruption of the units relay circuit during the period of premature contact of the tens brush with the selected segment.

Interruption of the circuit through the units relay 52$^a$ in response to completion of the auxiliary circuit is effected by energization of a lockout relay 54$a$ (FIG. 1). The coil of this relay is connected in series with the lockout switch 55$^b$ in the auxiliary circuit for energization of the relay when the tens brush 35$^b$ engages the tens segment preceding the selected segment. Normally closed contacts 54$^a$–1 (FIG. 1) of the lockout relay are connected in series with the coil of the units relay 52$^a$ and open to prevent energization of the latter when the lockout relay is energized. Thus, the units relay remains deenergized to prevent energization of the signal relay at the contacts 52$^a$–1 so long as the tens brush contacts the segment preceding the selected one. During this same time, the motor relay 13 remains energized for continued operation of the motor 11.

After the tens brush 35$^b$ moves off of the preceding tens segment 33$^b$, the lockout relay 54$^a$ is deenergized to restore the control over the motor to the units relay 52$^a$. In other words, the latter may be energized through the units brush 35$^a$ after the tens brush leaves the preceding segment.

Like the tens selector switch 18$^b$, the lockout switch 55$^b$ comprises ten stationary contacts 56$^b$ (FIG. 1) arranged in an annular series and engageable individually by one end of a selectively movable contact arm 58$^b$. The other end of the arm is connected to a conductor 60 which is connected to the coil of the lockout relay through another conductor 64. The lockout contacts 56$^b$ are connected individually through conductors 61 and the selector switch conductors 27$^b$ to the respective tens segments 33$^b$ so that, when the contact arm engages one of the lockout contacts, the corresponding tens segment is connected into the auxiliary control circuit in series with the lockout relay.

To simplify the operation, it is preferred to position the lockout contact arm 58$^b$ in unison with the wiper 25$^b$ and thereby connect the respective tens segments 33$^b$ into the auxiliary circuit through the lockout relay 54$^a$ automatically as an incident to connection of the next succeeding segments into the circuit of the tens relay 52$^b$. For this purpose, the two switches are arranged coaxially in spaced relation. Also, the contact arm is secured to the wiper shaft 20$^b$ (FIG. 1) in the proper position to engage the selector contact 56$^b$ which is connected to the segment next preceding the segment connected to the selected contact 26$^b$ by the wiper. For example, as shown in FIG. 1, the contact arm 58$^b$ is connected to the "1" segment when the wiper 25$^b$ is connected to the "2" segment.

As discussed above, the difficulty due to the leading overlap $x$ of the tens brush 35 arises only when the units digit of the selected number corresponds to one of those units segments 33$^a$ engaged by the units brush 35$^a$ during the period of premature contact of the tens brush 35$^b$ with the selected tens segment 33$^b$. Herein, the units digits which are troublesome due to the leading overlap of the tens brush are 6, 7, 8 and 9. Not only is energization of the lockout relay 54$^a$ not needed when any of the other units digits is selected, but it is actually undesirable in the case of some of the other digits. In view of this, means 72$^a$ is provided for selectively disabling the auxiliary circuit through the lockout relay or conditioning the same for completion in response to contact of the tens brush with the tens segment preceding the selected segment. When one of the troublesome 6, 7, 8 and 9 units digits is selected, the selective means is actuated to render the auxiliary circuit responsive to the position of the tens brush so that the lockout relay is energized to prevent stopping of the output shaft 10 during premature contact of the tens brush with the selected segment. When one of the other units digits is selected, and thus when the lockout circuit is not needed, the selective means is actuated to disable the circuit.

The selective means 72$^a$ for disabling the lockout circuit and conditioning the same to respond to the position of the tens brush 35$^b$ herein comprises a compensator switch 72$^a$ (FIG. 1) which is interposed in series with the lockout relay 54$^a$ and the lockout switch 55$^b$ in the lockout circuit. When the compensator switch is open, the circuit is interrupted so that the lockout relay 54$^a$ cannot be energized to disable the units relay 52$^a$ regardless of the position of the tens brush. When the compensator switch is closed, the lockout relay is energized to disable the units relay circuit and prevent stopping of the motor as long as the tens brush contacts the tens segment 33$^b$ preceding the selected segment.

To simplify the set up of the various circuits for a desired number and to insure that the lockout circuit is either disabled or conditioned for response to the position of the tens brush 35$^b$ correctly in accordance with the desired units digit, it is preferred to actuate the compensator switch 72$^a$ as an incident to selection of the desired digit. For this purpose, the compensator switch comprises a contact arm 73$^a$ secured to and movable with the shaft 20$^a$ of the units switch wiper 25$^a$. Angularly spaced around the shaft are a series of contacts 74$^a$ which correspond to the different units segments 33$^a$ and are engaged individually by the contact arm when the respective units switch contacts 26$^a$ are engaged by the units wiper. To connect the compensator switch in the lockout circuit and close the switch in response to the selection of one of the units digits affected by the leading overlap $x$ of the tens brush, herein, 6, 7, 8 and 9, the corresponding "6," "7," "8" and "9" compensator contacts 74$^a$ are connected by conductors 75$^a$ to the conductor 64 in series with the lockout relay 54$^a$ (FIG. 1). Also, the compensator contact arm 73$^a$ is connected by the conductor 60 to the lockout switch arm 58$^b$. In this instance, the "5" compensator contact also is connected to the lockout relay conductor 64. The other compensator contacts corresponding to the units segments from "0" to "4," however, are not connected into the lockout circuit. Thus, if one of the units digits from 0 to 4 is selected, the lockout circuit will be interrupted at the compensator switch.

In the present instance (see FIG. 5), the compensator switch contacts 74$^a$ are supported on a plate 57 of insulating material paralleling and secured to the units switch plate 22. The contact arm 73$^a$ is a radially disposed conductive strip rigid with an insulating collar 62 which is secured adjustably to the wiper shaft 20$^a$. One end of the arm engages the contacts 74$^a$ and the other end slides around a conducting ring 59 secured to the plate and connected to the conductor 60 which, in turn, is connected to the lockout switch arm 58$^b$.

To illustrate the operation of the lockout circuit through the lockout switch 55$^b$ and the compensator switch 72$^a$, let it be assumed first that the brushes 35$^a$ and 35$^b$ are in their zero positions of FIG. 8 and that the wipers 25$^a$ and 25$^b$ of the units and tens switches 18$^a$ and 18$^b$ have been moved into engagement with the respective "7" contacts 26$^a$ and 26$^b$ as shown in full lines in FIG. 19. This results in selection of the number 77 which corresponds to 7.7 revolutions of the output shaft 10 and the units brush. As an incident to such selection, the compensator switch arm 73$^a$ is brought into engagement with the "7" compensator contact 74$^a$ to close the compensator switch 72$^a$ in the lockout circuit (FIG. 19). Also, the lockout switch arm 58$^b$ is brought into engagement with the contact 56$^b$ which is connected to the "6" tens segment preceding the selected "7" segment of the tens commutator 34$^b$. After this selection is made and with the brushes in their zero positions, the units and tens relays 52$^a$ and 52$^b$ and the lockout relay 54$^a$ are deenergized because the brushes are not yet engaging their segments selected on the various switches.

Once the motor relay 13 has pulled in to energize the motor 11 and the brushes 35$^a$ and 35$^b$ move away from their zero positions, the various relays 52$^a$, 52$^b$ and 54$^a$ will be energized at such times as their individual circuits are completed through the associated segments and brushes. Thus, the units relay 52$^a$ circuit is completed as long as the lockout relay 54$^a$ is deenergized and each time the units brush 35$^a$ wipes across the selected "7" units segment. The units relay then is energized and deenergized once in each of the first five revolutions of the units brush because, during this movement, the tens brush has not yet reached the preceding "6" segment for energization of the lockout relay. The units relay also is again energized briefly as the units brush moves onto the selected "7" segment in the sixth revolution of the brush just before the brush completes 5.7 revolutions and reaches the position shown in FIG. 15. When the units brush reaches this position, the tens brush moves onto the preceding "6" tens segment and the circuit for the lockout relay is completed through the tens brush, the lockout switch 55$^b$ and the compensator switch 72$^a$. The lockout 54$^a$ relay then pulls in to open its contacts 54$^a$–1 in the circuit for the units relay and thereby disable the latter.

The lockout relay 54$^a$ remains energized to interrupt the units relay circuit until the trailing edge of the tens brush 35$^b$ moves off of the "6" tens segment 33$^b$. This occurs after the units brush 35$^a$ has completed 7.3 revolutions and is in the same position as is shown in FIG. 11. When the units brush has traveled 6.7 revolutions and reaches the position shown in FIG. 15, the tens brush moves onto its selected "7" segment to complete the circuit for the tens relay 52$^b$. This relay then pulls in to close its contacts 52$^b$–1 in the circuit for the signal relay 12. The latter is not energized however because its circuit still is open at the units relay contacts 52$^a$–1. The motor then continues to run even though the brushes engage their selected segments simultaneously.

After the units brush 35$^a$ has completed 7.3 revolutions and as the tens brush 35$^b$ leaves the preceding "6" segment, the circuit for the lockout relay 54$^a$ is interrupted at the tens brush. This relay then drops out and its contacts 54$^a$–1 close in the circuit for the units relay 52$^a$ to return the control of this circuit to the units brush. After such control is restored, the units brush continues to move in its eighth revolution until it contacts the selected "7" segment as shown in FIG. 19. The units relay circuit then is completed and its contacts 52$^a$–1 close in series with the then closed tens relay contacts 54$^a$ to complete the circuit for the signal relay 12. This results in opening of the contacts 12–1 in the motor relay circuit for deenergization of the motor relay 13 and the motor so that the output shaft stops. The shaft then will have completed approximately the desired 7.7 revolutions.

The lockout relay 54$^a$ is inactive when the units digit of the selected number corresponds to one of the contacts 74$^a$ of the compensator switch 72$^a$ not connected into the lockout circuit, herein, the contacts numbered 0 through 4. Assuming, for example, that the desired number is 21 and the wipers 25$^a$ and 25$^b$ are engaging the "1" and "2" contacts 26$^a$ and 26$^b$ respectively of the units and tens switches 18$^a$ and 18$^b$ as shown in dotted lines in FIG. 19, the compensator switch arm 73$^a$ engages the "1" contact 74$^a$. The compensator switch 72$^a$ thus is open and the lockout circuit is interrupted throughout the movement of the brushes to the positions corresponding to the desired number. The lockout switch arm 58$^b$ engages the contact 56$^b$ corresponding to the "1" tens segment 33$^b$ which precedes the selected "2" segment. However, due to the open condition of the compensator switch, the lockout circuit cannot be completed through the lockout switch and the tens brush when the latter engages the "1" segment. As a result the units relay 52ª will be energized each time the units brush engages the "1" segment. Thus, after approximately 2.1 revolutions of the units brush, both the units and the tens relays will be energized through their respective brushes to complete the signal relay circuit for stopping the output shaft 10.

By disabling the circuit through the lockout relay 54ª when energization of the relay is not needed to compensate for the leading overlap $x$ of the tens brush 35ᵇ, the compensator switch 72ª avoids a difficulty which otherwise would occur due to the trailing overlap $y$ of the brush. With such overlap, the trailing edge portion of the brush engages the tens segment 33ᵇ preceding the selected segment after the units brush 35ª has completed the number of revolutions corresponding to the selected tens segment, or in other words, after the end of the period of premature contact of the tens brush with the selected segment. During such prolonged contact, the units brush wipes across and out of engagement with the "0" and "1" units segments 33ª as shown in FIGS. 8 to 11. Thus, if the selected units digit corresponded to either of these segments, and if the lockout circuit extended through the lockout switch 55ᵇ so that the lockout relay were energized during contact of the tens brush with the preceding tens segment regardless of what units digit were selected, the circuit through the units relay could not be completed for stopping the motor even through the output shaft had completed the number of revolutions corresponding to the selected number. However, with the compensator switch disabling the lockout relay when the "0" and "1" units segments are selected, the units relay can be energized for stopping the motor at the proper time.

The trailing overlap $y$ of each of the brushes 35ª and 35ᵇ with the associated "9" segment in the zero position of the brush also gives rise to two other difficulties. The first of these occurs in connection with starting of the motor 11 when each of the digits of the desired number is a 0 or a 9. The troublesome numbers in this case then are 09, 90 and 99. When any of these numbers is selected on the switches 18ª and 18ᵇ and the brushes are in their zero positions as shown in FIGS. 1 and 8, both brushes will be contacting their selected segments to complete the circuits through the units and tens relays 52ª and 52ᵇ as soon as the wipers 25ª and 25ᵇ are moved to make the selection. With both relays energized, the circuit for the signal relay 12 is completed and the latter pulls in to interrupt the circuit through the motor relay 13. This circuit then remains open and the motor remains deenergized when the start switch is closed.

The other difficulty is premature completion of the signal relay circuit and stopping of the motor 11 if the selected number has a tens digit of 9 and a units digit corresponding to one of those units segments 35ª which are engaged by the units brush 35ª after this brush has moved out of contact with the "9" and "0" segments and before the trailing edge of the tens brush 35ᵇ leaves the "9" tens segment. In this instance the affected digits are 1, 2 and 3 as shown in FIGS. 9, 10 and 11. The troublesome numbers then are 91, 92 and 93. If any of these is selected on the units and tens switches 18ª and 18ᵇ with the brushes in their zero positions, the tens relay circuit will be completed as soon as the selection is made. Then, if the motor is started and the units brush moves away from the zero position, the brush will contact the selected units segment to energize the units relay and complete the signal circuit for stopping the shaft 10 after it has traveled through only a partial revolution rather than the desired nine revolutions.

To overcome the additional difficulties due to the trailing overlap $y$ of the brushes 35ª and 35ᵇ, the invention contemplates disabling the control of the brushes over the signal relay circuit whenever either digit of the selected number is a 9 and until the brush corresponding to the 9 digit leaves its "9" segment. Then, the control over the circuit is restored to the brushes. Disabling of such control is effected by interrupting the signal relay circuit. For this purpose, disabling contacts 65–1 are connected in series with the signal relay and the contacts 52ª–1 and 52ᵇ–1 of the units and tens relays 52ª and 52ᵇ (FIG. 1). These contacts normally are closed so that the signal circuit may be completed in response to simultaneous energization of the units and tens relays when the brushes engage the selected segments. However, the disabling contacts are opened in response to closure of the start switch contacts 14 and are maintained open when the "9" segment is selected on either of the commutators 34ª and 34ᵇ. When the disabling contacts are open, the signal circuit cannot be completed for stopping the output shaft or preventing starting thereof even though both the units and the tens relays may be energized.

The disabling contacts 65–1 are opened in response to closing of the start switch 14 by utilizing, as these contacts, normally closed contacts of a common disabling relay 65 which is energized when the start switch is closed. Such energization is effected by connecting the coil of the relay in series with normally open contacts 14–1 of the start switch between the battery conductor 15 and ground (FIG. 1). With this arrangement the disabling relay is energized and the signal relay circuit is interrupted during closure of the start switch.

For the purpose of maintaining the common disabling relay 65 energized after the start switch 14 and its contacts 14–1 are opened and when the "9" units segment is the selected segment, a units disabling relay 67ª is provided (FIG. 1). This relay is responsive to the position of the units brush 35ª and operates to maintain a holding circuit for the common relay after the start switch is opened and as long as the brush engages the "9" segment. This holding circuit parallels the start switch contacts 14–1 and extends from the battery conductor 15 through normally open contacts 67ª–1 of the relay and a conductor 66 to the coil of the common relay. When the units disabling relay is energized, this circuit is completed and the common relay also is energized.

The units disabling relay 67ª is energized in response to closure of the start switch contacts 14–1 after selection of the "9" units segment 33ª and remains energized until the units brush 35ª moves out of contact with the "9" segment. Then, the relay drops out and the holding circuit is interrupted at the contacts 67ª–1. Such operation is obtained by connecting one terminal of the relay coil to the battery conductor 15 through two circuits, one extending through the normally open contacts 67ª–1 of the relay and the other extending in series through the conductor 66 and the start switch contacts 14–1 (FIG. 1). The other terminal of the relay is connected to a contact arm 69ª of a units disabling multiple switch 68ª having an annular series of contacts 70ª engageable individually by the arm. One of these contacts is connected by a conductor 71ª to the "9" segment of the units commutator 33ª and the arm is secured to the units switch shaft 20ª (FIGS. 1 and 5) to engage this contact when the wiper 25ª engages the units switch contact 26ª corresponding to the "9" segment. The other contacts of the multiple switch are not connected itno the circuits.

With the above connections for the units disabling relay 67ª, its energizing circuit is completed when the units brush 35ª is in its zero position of contact with the "9" segment, the wiper 25ª is positioned to select the "9" segment, and the start switch 14–1 contacts are closed. Upon energization of the relay, its contacts 67ª–1 close to complete its own holding circuit and a holding circuit for the common disabling relay 65 around the start switch contacts. Both disabling relays then remain energized until the units brush moves off of the "9" segment. Then, the units disabling relay drops out and its contacts open to interrupt both holding circuits. This is followed by dropout of the common relay and closure of its contacts 65–1 to restore control over the signal circuit to the units and tens relays 52$^a$ and 52$^b$. If the "9" segment is not selected on the units commutator 34$^a$, the units disabling relay is not energized when the start switch is closed and the holding circuit for the common relay is not completed at the contacts 67$^a$–1. Without a holding circuit, the common relay drops out when the start switch contacts 14–1 open.

Associated with the tens commutator 34$^b$ are a tens disabling relay 67$^b$ and related circuits similar in operation to the units disabling relay 67$^a$ and its circuits. Thus, if a "9" segment is selected on either of the commutators, the corresponding disabling relay will be energized when the start switch contacts 14–1 are closed and will maintain a holding circuit for the common disabling relay 65 until the selected "9" segment is disengaged by the associated brush.

As noted above, the hundreds commutator 34$^c$ and its parts are related to the tens commutator 34$^b$ and associated parts in the same way as the latter are related to the units commutator 34$^a$ and its parts. Thus, to compensate for the leading overlap $x$ of the hundreds brush 35$^c$ and still insure response to all numbers which may be selected on the tens and hundreds switches 18$^b$ and 18$^c$, there are provided a hundreds lockout switch 55$^c$, a tens lockout relay 54$^b$ and a tens compensator switch 72$^b$ which correspond to the tens lockout switch 55$^b$, the units lockout relay 54$^a$ and the units compensator switch 72$^a$. Similarly, a disabling relay 67$^c$ and a disabling switch 68$^c$ corresponding to the units and tens disabling relays 67$^a$ and 67$^b$ and switches 68$^a$ and 68$^b$ are provided to avoid the difficulties encountered due to the trailing overlap $y$ when the "9" segment 33$^c$ is the selected segment on the hundreds commutator 34$^c$.

In summary of the operation of the improved measuring mechanism with all three of the commutators 34$^a$, 34$^b$ and 34$^c$ active, let it be assumed that the output shaft has been stopped with the brushes 35$^a$, 35$^b$ and 35$^c$ in their zero positions of overlap of the adjacent 9 and 0 segments. Also, let it be assumed that the wipers 25$^a$, 25$^b$ and 25$^c$ have been turned to select the number 928 as shown in FIG. 1. As soon as this selection is made, the circuits through the units and tens relays 52$^a$ and 52$^b$ are interrupted because the units and tens brushes are not contacting the "2" and "8" commutator segments selected by the units and tens wipers. The hundreds relay 52$^c$ however is energized through the first hundreds switch 18$^c$ and the hundreds brush because the latter is contacting the selected "9" segment 33$^c$. Since the units and tens relays are deenergized, their contacts 52$^a$–1 and 52$^b$–1 in the circuit for the signal relay 12 are open and the latter is deenergized with its contacts 12–1 closed in the circuit for the motor relay 13. When the start switch 14 is closed, the motor relay is energized through its normally closed contacts 13–1, the start switch and the then closed signal relay contacts 12–1. This results in closure of the contacts 13–3 in the circuit for the motor 11 and of the contacts 13–2 in the motor relay holding circuit.

Closure of the start switch 14 also completes a circuit through the common disabling relay 65 at the contacts 14–1 so that this relay is energized to open its contacts 65–1 in the signal relay circuit. Due to selection of the "9" segment of the hundreds commutator 34$^c$, closure of the start switch also completes a circuit for the hundreds disabling relay 67$^c$ extending through the arm 69$^c$ of the hundreds disabling switch 68$^c$, the conductor 71$^c$, the "9" segment of the hundreds commutator, and the hundreds brush 35$^c$. The hundreds disabling relay then pulls in and its contacts 67$^c$–1 close to complete its own holding circuit and one for the common relay 65. Now, when the start switch is released, the motor relay 13, the common disabling relay, the hundreds relay 52$^c$ and the hundreds disabling relay 67$^c$ all remain energized. If no "9" segment had been selected on any commutator, all disabling relays would be deenergized upon release of the start switch.

Once the motor 11 has been energized, it will continue to run until the common disabling relay 65 drops out and the relays 52$^a$, 52$^b$ and 52$^c$ of the three commutators pull in simultaneously to complete the circuit for the signal relay 12. This should occur only after travel of the units brush 35$^a$ through 92.8 revolutions, the tens brush 35$^b$ through 9.28 revolutions and the hundreds brush 35$^c$ through .928 of a revolution. In every revolution of the units brush 35$^a$ except those in which the tens brush 35$^b$ is contacting its "1" segment, that is, the segment preceding the selected "2" segment, the units relay 52$^a$ pulls in to close its contacts 52$^a$–1 in the signal relay circuit. During contact of the tens brush with its preceding "1" segment 33$^b$, the circuit for energizing the units lockout relay 54$^a$ is completed through the tens brush, the "1" segment, one of the conductors 27$^b$, the number 1 contact 56$^b$ of the lockout or second tens switch 55$^b$, the contact arm 58$^b$ of the lockout switch, the conductor 60, the contact arm 73$^a$ and the number 8 contact 75$^a$ of the units compensator switch 72$^a$, the conductors 75$^a$, 64 and 15 and the battery 16. The units lockout relay 54$^a$ then pulls in to interrupt the circuit to the units relay 52$^a$ so that the latter remains deenergized even though the units brush contacts the selected "8" units segment and the tens brush moves onto the "2" segment to energize the tens relay 52$^b$ through the wiper of the tens selector switch 18$^b$.

As soon as the tens brush 35$^b$ leaves the "1" segment 33$^b$ in each of its revolutions, the units lockout relay circuit is opened and this relay 54$^a$ drops out to render the units relay 52$^a$ once again responsive to contact of the units brush 35$^a$ with the selected "8" segment. Thus, when the tens brush is contacting its selected "2" segment but is out of contact with the preceding "1" segment and the units brush contacts the selected "8" segment, both of the units and tens relays 52$^a$ and 52$^b$ are energized to close their contacts 52$^a$–1 and 52$^b$–1 in the signal relay circuit. Until the tens brush 35$^b$ has traveled three revolutions and the hundreds brush 35$^c$ first moves off of its selected "9" segment, the hundreds relay 52$^c$ also will be energized. However, at this same time, the common disabling relay 65 remains energized through the hundreds disabling relay contacts 67$^c$–1 and the common disabling contacts 65–1 are open in the signal relay circuit so that the signal relay 12 cannot pull in.

Once the hundreds brush 35$^c$ moves off of its selected "9" segment 33$^c$, the circuit for the hundreds disabling relay 67$^c$ through the hundreds disabling switch 68$^c$ opens. This relay then drops out thereby interrupting the holding circuit for the common disabling relay 65 and permitting the latter to drop out. The hundreds relay 52$^c$ also drops out due to interruption of its circuit at the hundreds brush. Thus, the signal relay circuit now is interrupted at the hundreds relay contacts 52$^c$–1 and the motor remains energized. The hundreds relay contacts 52$^c$–1 and therefore the signal relay circuit now remain open until the hundreds brush has moved clockwise and back into contact with the selected "9" segment. During this movement of the hundreds brush, the units and tens relays 52$^a$ and 52$^b$ intermittently pull in and drop out.

When the leading edge of the leading element 47 of the hundreds brush 35$^c$ first contacts the selected "9" segment after leaving the latter, the hundreds relay circuit is completed through the hundreds selector switch 18$^c$. Such contact, due to the leading overlap $x$ of the hundreds brush, occurs before the tens brush 35$^b$ has completed nine revolutions but after the tens brush, in its ninth revolution, has passed its selected "2" segment. Thus, there is no need in this case to compensate for the leading overlap of the hundreds brush. Accordingly, the circuit for the tens lockout relay 54$^b$ is open at the tens compensator switch 72$^b$. This relay then is not energized when the hundreds brush contacts the "8" segment which precedes the selected "9" segment.

The next time the units and tens relays 52$^a$ and 52$^b$ pull in simultaneously after the hundreds brush 35$^c$ contacts the selected "9" segment and while the hundreds relay 52$^c$ is energized, the circuit through the signal relay 12 is completed and its contacts 12–1 open in the motor relay circuit. As a result, the motor relay 13 drops out and its contacts 13–3 open in the motor circuit to interrupt operation of the motor and stop the output shaft 10. When this occurs, each of the brushes will have completed the required number of revolutions corresponding to the numbers selected on the various selector switches 18$^a$, 18$^b$ and 18$^c$ and the brushes will be contacting the different segments corresponding to these numbers. The brushes may be returned to their zero positions in various ways as, for example, by setting the various wipers 25$^a$, 25$^b$ and 25$^c$ on the zero contacts of the selector switches and closing the start switch 14. To avoid moving the machine part during this resetting of the brushes, the motion of the output shaft may be transmitted to the part through a suitable clutch (not shown) which is disengaged during the resetting.

It will be apparent that the novel mechanism described above is capable of measuring rotation of the shaft 10 and stopping the same accurately after any preselected number of revolutions within the range of numbers from 1 to 999 available on the selector switches 18$^a$, 18$^b$ and 18$^c$. By virtue of the overlap of each commutator brush with adjacent segments as it moves from one segment to the next, the commutators may be manufactured easily and at low cost without precision in the size of the brushes and the segments or the circumferential spacing of the segments. The novel lockout and disabling circuits make possible such overlap of the brushes and the segments and also a simple construction of each commutator with only one brush and ten segments while avoiding erroneous response to numbers preceding the selected number. Thus, the lockout relays 54$^a$ and 54$^b$, the tens and hundreds lockout switches 55$^b$ and 55$^c$ and the compensator switches 72$^a$ and 72$^b$ cooperate to compensate for the overlap $x$ of the leading edge portions of the tens and hundreds brushes. The disabling relays 65, 67$^a$, 67$^b$ and 67$^c$ and the disabling switches 68$^a$, 68$^b$ and 68$^c$ cooperate to compensate for the overlap $y$ of the trailing edge portions of all three brushes. Overlap of the brushes and segments also is made possible without precision in the location of the axial faces of adjacent segments by dividing each brush into the two circumferentially spaced and individually yieldable elements 47. This construction insures that the brush will make good contact simultaneously with adjacent segments in spite of variations in the heights of their axial faces.

I claim as my invention:

1. The combination of, a rotary shaft, a power actuator for rotating the same, units and tens commutators having units and tens brushes driven from said shaft in a ratio of ten to one and each wiping across ten segments arranged in an annular series, units and tens multiple switches having contacts respectively connected to the corresponding commutator segments and engageable individually by separate units and tens wipers, a units relay having an energizing circuit extending through said units switch and said units commutator and normally completed when the units brush engages the units segment selected by the units wiper, a tens relay similarly energized when said tens brush engages the tens segment selected by the tens wiper, means operable to stop said actuator upon simultaneous energization of said units and tens relays, a lockout relay adapted when energized to interrupt said units relay circuit and thereby prevent energization of the units relay, a second tens multiple switch having ten contacts respectively connected to the different tens segments and engageable individually by a contact arm, said arm moving with said tens wiper and engaging the second tens contact corresponding to the tens segment next preceding the segment selected by the tens wiper, and an energizing circuit for said lockout relay extending through said second tens switch and said tens commutator for energization of the relay in response to engagement of said preceding tens segment by said tens brush.

2. The combination of, a rotary shaft, a power actuator for rotating said shaft, units and tens commutators each having a brush and an annular series of segments movable relative to each other to bring the brush successively into contact with the respective segments as an incident to rotation of said shaft, the brush and segments of the tens commutator having relative movement in the ratio of 1 to 10 of the relative movement of the units brush and segments, units and tens multiple switches having contacts respectively connected to the corresponding commutator segments and engageable individually by units and tens wipers, means controlling said actuator and normally operable to stop the same in response to simultaneous engagement of the brushes with the respective commutator segments selected by said switches, said tens brush having a zero position of overlapping engagement of its leading edge portion with one of the tens segments whereby the brush engages the selected tens segment prematurely, overriding control means responsive to the relative movement of said tens brush and segments and operable, when rendered effective, to disable said actuator control means during the period of premature contact of the tens brush with said selected tens segment, and means operable to render said overriding control means effective when the segment selected on said units commutator by said units wiper is a segment contacted by said units brush during said premature contact period.

3. The combination of, a rotary shaft, units and tens commutators having units and tens brushes driven from said shaft in a ratio of ten to one and each wiping across ten segments, units and tens switches having contacts connected respectively to corresponding commutator segments and engageable individually by units and tens wipers, units and tens relays having energizing circuits extending through the respective brushes for energization of each relay when the associated brush engages the segment selected on the corresponding swtich, said tens brush overlapping adjacent segments on said tens commutator so as to engage prematurely the segment selected on said tens switch, means including said relays and operable to give a signal in response to simultaneous energization of the relays, means including a lockout relay and operable to disable said signal means when the lockout relay is energized, a lockout switch having ten contacts connected to the respective tens commutator segments and a contact arm engageable with the tens segment next preceding said selected segment, a compensator switch normally closed when the segment selected on said units commutator by said units switch is a segment engaged by said units brush during the premature contact of said selected tens segment by said tens brush, and an energizing circuit for said lockout relay extending through said lockout and compensator switches for energization of the relay when the compensator switch is closed and said tens brush engages said preceding tens segment.

4. The combination of, a rotary shaft, units and tens commutators having units and tens brushes driven from said shaft in a ratio of ten to one and each wiping across ten segments, units and tens switches having contacts connected respectively to corresponding commutator segments and engageable individually by units and tens wipers, units and tens relays having energizing circuits extending through the respective brushes for energization of each relay when the associated brush engages the segment selected on the corresponding switch, said tens brush overlapping adjacent segments on said tens commutator so as to engage prematurely the segment selected on said tens switch, means including said relays and operable to give a signal in response to simultaneous energization of the relays, means including a lockout relay and operable to disable said signal means when the lockout relay is energized, control means responsive to the movement of said tens brush and operable when rendered effective to disable said signal means while the tens brush is engaging the tens segment next preceding said selected tens segment, and means for rendering said control means effective when the segment selected on said units commutator is a segment contacted by said units brush during the period of premature contact of said selected tens segment by said tens brush.

5. The combination of a rotary shaft, units and tens commutators having brushes driven from said shaft in a ratio of ten to one and each wiping across ten segments arranged in an annular series, units and tens multiple switches each having contacts respectively connected to the corresponding commutator segments and engageable individually by a wiper, a units relay normally energized when the brush of the units commutator engages the segment thereof selected on said units switch, a tens relay similarly energized when the brush of the tens commutator engages the segment thereof seleected on said tens switch, means including said relays and operable to give an electrical signal in response to simultaneous energization of the relays, said tens brush overlapping adjacent segments on said tens commutator so as to engage said selected segment thereof prematurely, control means responsive to the movement of said tens brush and operable when rendered effective to disable said signal means while the tens brush is engaging the tens segment next preceding said selected tens segment, and means for rendering said control means effective when the segment selected on said units commutator is a segment contacted by said units brush during the period of premature contact of said tens brush with said selected tens segment.

6. The combination of, a rotary shaft, units and tens commutators having units and tens brushes connected to said shaft rotation relative to each other in a ratio of ten to one and each wiping across ten segments arranged in an annular series, units and tens multiple switches having contacts connected respectively to the corresponding commutator segments and engageable individually by separate units and tens wipers, means operable, when rendered effective, to give a signal in response to simultaneous engagement of said brushes with the respective commutator contacts selected by said switches, said tens brush overlapping adjacent segments on said tens commutator so as to engage said selected segment thereof prematurely, a multiple lockout switch having ten contacts connected to the respective segments of said tens commutator and a contact arm movable with said tens wiper and engaging the lockout switch contact corresponding to the tens segment next preceding said selected segment, a compensator switch having a contact arm movable with said units wiper and a plurality of contacts engaged individually by said wiper as an incident to selection on said units switch of the units segments engaged by the units brush during the period of premature contact of said tens brush with said selected tens segment, and means including a lockout circuit and operable to disable said signal means when the circuit is completed, said lockout circuit extending through said lockout and compensator switches for completion when the compensator switch is closed and said tens brush engages said preceding segment.

7. The combination of, a rotary shaft, units and tens commutators having brushes connected to said shaft for rotation relative to each other in a ratio of ten to one and each wiping across ten segments arranged in an annular series, units and tens multiple switches having contacts connected respectively to the corresponding commutator segments and engageable individually be separate units and tens wipers, means operable, when rendered effective, to give a signal in response to simultaneous engagement of said brushes with the respective commutator contacts selected by said switches, said tens brush overlapping adjacent segments on said tens commutator so as to engage said selected segment thereof prematurely, a multiple lockout switch having ten contacts connected to the respective segments of said tens commutator and a contact arm movable with said tens wiper and engaging the lockout switch contact corresponding to the tens segment next preceding said selected segment, means including a lockout circuit and operable to disable said signal means when the circuit is completed, said lockout circuit extending through said lockout switch and said tens brush, and means responsive to the selection of a units segment on said units switch and operable, when the selected units segment is contacted by said units brush during the period of premature contact of said tens brush with said selected tens segment, to condition said lockout circuit for completion by engagement of the tens brush with said preceding segment.

8. The combination of, a rotary shaft, units and tens commutators having units and tens brushes connected to said shaft for rotation relative to each other in a ratio of ten to one and each wiping across ten segments arranged in an annular series, units and tens multiple switches having contacts connected respectively to the corresponding commutator segments and engageable individually by separate units and tens wipers, means operable, when rendered effective, to give a signal in response to simultaneous engagement of said brushes with the respective commutator contacts selected by said switches, said tens brush overlapping adjacent segments on said tens commutator so as to engage said selected segment thereof prematurely, a multiple lockout switch having ten contacts connected to the respective segments of said tens commutator and engageable individually by a selectively movable contact arm, means including a lockout circuit and operable to disable said signal means when the circuit is completed, said circuit extending through said contact arm and the lockout switch contact corresponding to the tens segment preceding the segment selected on said tens switch, and selective means rendered effective when the segment selected on said units commutator is a segment contacted by said units brush during the period of premature contact of said tens brush with said selected tens segment, said selective means operating when rendered effective to condition said lockout circuit for completion in response to contact of said tens brush with said preceding tens segment.

9. The combination of, a rotary shaft, units and tens commutators having units and tens brushes connected to said shaft for rotation in a ratio of ten to one and each wiping across ten segments arranged in an annular series, units and tens multiple switches having contacts connected respectively to the corresponding commutator segments and engageable individually by separate units and tens wipers, means operable, when rendered effective, to give a signal in response to simultaneous engagement of said brushes with the respective commutator contacts selected by said switches, said tens brush overlapping adjacent segments on said tens commutator so as to engage said selected segment thereof prematurely and before said units brush has reached a position corresponding to the selected tens segment, and overriding control means conditioned in response to selection of units and tens segments on said switches and operating, when the units segment selected on the units commutator is a segment contacted by said units brush during the period of premature engagement of said tens brush with said selected tens segment, to disable said signal means until after said units brush has reached said corresponding position thereof.

10. The combination of, a rotary shaft, units and tens commutators having units and tens brushes driven from said shaft in a ratio of ten to one and each wiping across ten segments arranged in an annular series, units and tens multiple switches having contacts respectively connected to the corresponding commutator segments and engageable individually by units and tens wipers, means operable when rendered effective to give a signal in response to simultaneous engagement of the brushes with the respective commutator segments selected on said switches, said tens brush having a zero position of overlapping engagement of its leading edge portion with one of the tens segments whereby the brush engages the tens segment selected by said tens wiper prematurely and before such engagement is desired, overriding control means including a lockout circuit and operable to disable said signal means when the circuit is completed, said lockout circuit extending through the segment of said tens commutator next preceding the segment selected on said tens switch, and selective means rendered effective when the segment selected on said units commutator is a segment contacted by said units brush during the period of premature contact of said tens brush with said selected tens segment, said selective means operating when rendered effective to condition said lockout circuit for completion in response to contact of said tens brush with said preceding tens segments.

11. The combination of, a rotary shaft, units and tens commutators having units and tens brushes driven from said shaft in a ratio of ten to one and each wiping across ten segments arranged in an annular series, units and tens multiple switches having contacts respectively connected to the corresponding commutator segments and engageable individually by units and tens wipers, means operable when rendered effective to give a signal in response to simultaneous engagement of the brushes with the respective commutator segments selected on said switches, said tens brush having a zero position of overlapping engagement of its leading edge portion with one of the tens segments whereby the brush engages the tens segment selected by said tens wiper prematurely and before such engagement is desired, overriding control means responsive to the position of said tens brush and operable, when rendered effective, to disable said signal means when said tens brush contacts the tens segment preceding said selected tens segment, and means operable to render said overriding control means effective when the segment selected on the units commutator is a segment contacted by said units brush during the period of premature contact of said tens brush with said selected tens segment.

12. The combination of, a rotary shaft, units and tens commutators having units and tens brushes driven from said shaft in a ratio of ten to one and each wiping across ten segments arranged in an annular series, units and tens multiple switches having contacts respectively connected to the corresponding commutator segments and engageable individually by units and tens wipers, means operable when rendered effective to give a signal in response to simultaneous engagement of the brushes with the respective commutator segments selected on said switches, said tens brush having a zero position of overlapping engagement of its leading and trailing edge portions with adjacent segments of said tens commutator whereby the leading edge of the brush engages the segment selected by said tens wiper prematurely and the trailing edge of the brush has a prolonged period of undesired contact with such segment, overriding control means responsive to the position of said tens brush and operable, when rendered effective, to disable said signal means during the period of premature contact of the tens brush with said selected tens segment, and means operable to render said overriding control means ineffective when the segment selected on said units commutator is a segment contacted by said units brush during said prolonged period of contact of said tens brush with said selected tens segment.

13. The combination of, a rotary shaft, units and tens commutators each having a brush and an annular series of segments movable relative to each other to bring the brush successively into contact with the respective segments as an incident to rotation of said shaft, the brush and segments of the tens commutator having relative movement in the ratio of one to ten of the relative movement of the units brush and segments, units and tens multiple switches having contacts respectively connected to the corresponding commutator segments and engageable individually by units and tens wipers, means normally operable to give a signal in response to simultaneous engagement of the brushes with the respective commutator segments selected by said switches, said tens brush having a zero position of overlapping engagement of its leading edge portion with one of the tens segments whereby the brush engages the tens segment selected by said tens wiper prematurely, overriding control means responsive to the relative movement of said tens brush and segments and operable, when rendered effective, to disable said signal means during the period of premature contact of the tens brush with said selected tens segment, and means operable to render said overriding control means effective when the segment selected on said units commutator by said units wiper is a segment contacted by said units brush during said premature contact period.

14. The combination of, a rotary shaft, units and tens commutators each having a brush and an annular series of segments movable relative to each other to bring the brush successively into contact with the respective segments as an incident to rotation of said shaft, the brush and segments of the tens commutator having relative movement in the ratio of one to ten of the relative movement of the units brush and segments, units and tens multiple switches having contacts respectively connected to the corresponding commutator segments and engageable individually by units and tens wipers, means normally operable to give a signal in response to simultaneous engagement of the brushes with the respective commutator segments selected by said switches, said tens brush having a zero position of overlapping engagement of its leading edge portion with one of the tens segments whereby the brush engages the tens segment selected by said tens wiper prematurely and before such engagement is desired, and overriding control means responsive to the relative movement of said tens brush and segments and operable, when rendered effective, to disable said signal means during the period of premature contact of the brush with said selected tens segment whereby to compensate for said overlapping engagement in said zero position of the tens brush.

15. The combination of, a rotary shaft, units and tens commutators having brushes connected to said shaft for proportional rotation in a ratio of ten to one and each wiping across ten segments arranged in an annular series, units and tens multiple switches each having contacts connected respectively to the corresponding commutator segments and engageable individually by separate wipers, means including an energizing circuit and operable, when rendered effective to give a signal in response to simultaneous engagement of said brushes with the respective commutator segments selected by said switches, said tens brush having a zero position of overlapping engagement of its leading and trailing edge portions with adjacent segments on said tens commutator whereby the brush engages said selected segment thereof prematurely and before said units brush has reached a position corresponding to the selected tens segment, means conditioned in response to selection of contacts on said switches and operable to compensate for the premature engagement of said tens brush with the selected tens segment, and means responsive to the selection on said tens switch of said segment contacted by said trailing edge portion of said tens brush in said zero position thereof and operable to disable said energizing circuit until the tens brush moves out of contact with such segment.

16. The combination of a rotary shaft, units and tens commutators having units and tens brushes driven from said shaft in a ratio of ten to one and each wiping across ten segments of conducting material arranged in an annular series, said brushes having corresponding zero positions of overlap of the leading and trailing edge portions of each brush with adjacent segments of the associated commutator, units and tens selector switches each having ten contacts connected to the respective segments of the associated commutator and engageable individually by a wiper, means including an energizing circuit and normally operable to complete the latter and give an electrical signal in response to simultaneous engagement of said brushes with the respective segments corresponding to the contacts on said switches engaged by said wipers, a common disabling relay having contacts in said energizing circuit, and individual disabling relays one for each of said commutators controlling energization of said common disabling relay and cooperating with the latter to disable said energizing circuit when either one of said segments contacted by the trailing edges of said brushes in said zero positions is selected on said switches and until the associated brush moves out of contact with such segment.

17. The combination of a rotary shaft, units and tens commutators having units and tens brushes driven from said shaft in a ratio of ten to one and each wiping successively across segments of conducting material arranged in an annular series, said brushes having corresponding zero positions of overlap of the leading and trailing edge portions of each brush with adjacent segments of the associated commutator, units and tens selector switches each having ten contacts connected to the respective segments of the associated commutator and engageable individually by a wiper, means including an energizing circuit and normally operable to complete the latter and give an electrical signal in response to simultaneous engagement of said brushes with the respective segments corresponding to the contacts on said switches engaged by said wipers, and means including disabling relays individual to the respective commutators and operable when either of such relays is energized to disable said energizing circiut, each of said relays having an energizing circuit extending through the segment of the associated commutator engaged by the trailing edge portion of the brush thereof in the zero position of the brush.

18. The combination of a rotary shaft, units and tens commutators having units and tens brushes driven from said shaft in a ratio of ten to one and each wiping successively across the segments of conducting material arranged in an annular series, said brushes having corresponding zero positions of overlap of the leading and traliing edge portions of each brush with adjacent segments of the associated commutator, units and tens selector switches each having ten contacts connected to the respective segments of the associated commutator and engageable individually by a wiper, means including an energizing circuit and normally operable to complete the latter and give an electrical signal in response to simultaneous engagement of said brushes with the respective segments corresponding to the contacts on said switches engaged by said wipers, and means responsive to the selection on said switches of either one of said segments contacted by the trailing edges of said brushes in said zero positions and operable to disable said energizing circuit until the associated brush moves out of contact with such segment.

19. The combination of, a rotary shaft, a lower order commutator and a higher order commutator having brushes coupled to said shaft for turning in unison and in a ratio corresponding to the ratio of the lower and higher orders and a plurality of segments of conducting material circumferentially spaced apart in an annular series and insulated from each other, each of said brushes engaging the faces of the associated segments successively in each of its revolutions, lower and higher order selector means each operable to select a desired segment of the corresponding commutator, means including an energizing circuit and operable to give an electrical signal in response to simultaneous contact of said brushes with the different segments selected by the respective selector means, each of said brushes overlapping adjacent segments of the associated commutator in moving from one segment to the next and having two circumferentially spaced contact elements continuously connected together conductively and mounted for individual yielding movement toward and away from the faces of the segments to insure good contact of the brush with adjacent segments in spite of variations in the heights of such faces, and control means responsive to the relative movement of said higher order brush and segments and operable, when rendered effective, to disable said signal means during the period of premature contact of said brush with said selected higher order segment whereby to compensate for said overlapping engagement of said higher order brush with its associated segments.

20. The combination of a rotary shaft, a lower order commutator, a higher order commutator, means coupling said shaft to said commutators for rotation of the latter in unison and in a predetermined ratio, each of said commutators having a brush and an annular series of progressively numbered segments successively contacted by the brush in each revolution of relative rotation, a lower order selector and a higher order selector each operable to select a desired segment of the corresponding one of said commutators, means normally operable to give a signal in response to simultaneous engagement of the brushes with the different commutator segments separated by the segment selectors, said higher order brush being wide enough to straddle the selected segment and a portion of the next adjacent preceding segment while the lower order brush is traversing a predetermined portion of its revolution and to straddle said selected segment and the next adjacent succeeding segment during the remaining second portion of such revolution, a selector switch adjustable in unison with said lower order selector and operable to maintain said signaling means ineffectual while said lower order brush is traversing said second portion of the revolution, and a second selector switch adjusted in unison with said high order selector and operable to maintain said signaling means ineffectual while said high order brush is in contact with the segment next adjacent but preceding the segment selected by said high order selector.

21. Apparatus as defined in claim 20 in which one of said lower order segments is numbered zero, said apparatus including a third selector switch operable to maintain said signaling means ineffectual while said lower order brush is in contact with the segment next adjacent but preceding said zero segment.

References Cited in the file of this patent

UNITED STATES PATENTS

| | | |
|---|---|---|
| 2,087,039 | McMaster | July 13, 1937 |
| 2,496,585 | Harper | Feb. 7, 1950 |
| 2,570,306 | Battersby | Oct. 9, 1951 |
| 2,666,912 | Gow et al. | Jan. 19, 1954 |
| 2,686,236 | Hadtum | Aug. 10, 1954 |
| 2,750,584 | Goldfischer | June 12, 1956 |
| 2,818,557 | Sink et al. | Dec. 31, 1957 |